United States Patent

Suzuki et al.

[11] Patent Number: 6,081,721
[45] Date of Patent: Jun. 27, 2000

[54] COMMUNICATION METHOD, BASE STATION AND TERMINAL APPARATUS

[75] Inventors: Mitsuhiro Suzuki, Chiba; Kazuyuki Sakoda; Tomoya Yamaura, both of Tokyo; Tetsuya Naruse, Chiba; Jun Iwasaki, Tokyo; Shiro Ohmori, Kanagawa; Takashi Usui, Tokyo, all of Japan

[73] Assignee: Sony Corporation, Tokyo, Japan

[21] Appl. No.: 08/974,164

[22] Filed: Nov. 19, 1997

[30] Foreign Application Priority Data

Nov. 22, 1995 [JP] Japan ................................. 8-312295

[51] Int. Cl.[7] ..................................................... H04Q 7/20
[52] U.S. Cl. ............................. 455/450; 455/62; 455/517
[58] Field of Search .................................... 455/450, 451, 455/452, 454, 62, 512, 517, 524

[56] References Cited

U.S. PATENT DOCUMENTS

| | | |
|---|---|---|
| 5,263,176 | 11/1993 | Kojima et al. ............................. 455/62 |
| 5,287,552 | 2/1994 | Sasuta et al. ............................. 455/512 |
| 5,491,837 | 2/1996 | Haartsen .................................. 455/450 |
| 5,497,503 | 3/1996 | Rydberg et al. ........................ 455/454 |
| 5,541,552 | 7/1996 | Suzuki et al. . | |
| 5,694,415 | 12/1997 | Suzuki et al. . | |

*Primary Examiner*—Reinhard J. Eisenzopf
*Assistant Examiner*—Sam Bhattacharya
*Attorney, Agent, or Firm*—Jay H. Maioli

[57] ABSTRACT

In order cope with a change of the transmitting capacity in a wireless telephone system. A number of transmission channels are set within the transmission frequency band prepared for each base station. When a communication is made between the terminal equipment and the base station through the transmission channels, at least a first transmission channel and a second transmission channel are set as the transmission channel depending on a class of information to be transmitted. The first transmission channel is set to have a fixed transmitting capacity and the second transmission channel is set so that the minimum transmitting capacity may be defined and the transmitting capacity greater than the minimum transmitting capacity may be set depending on the setting condition of the transmission channels within the transmission frequency band prepared.

12 Claims, 4 Drawing Sheets

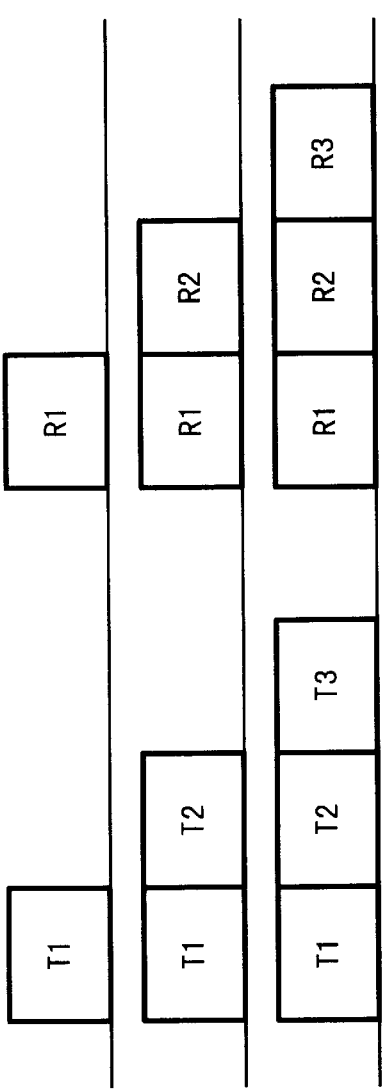
FIG. 4A  One Slot Used
FIG. 4B  Two Slots Used
FIG. 4C  Three Slots Used
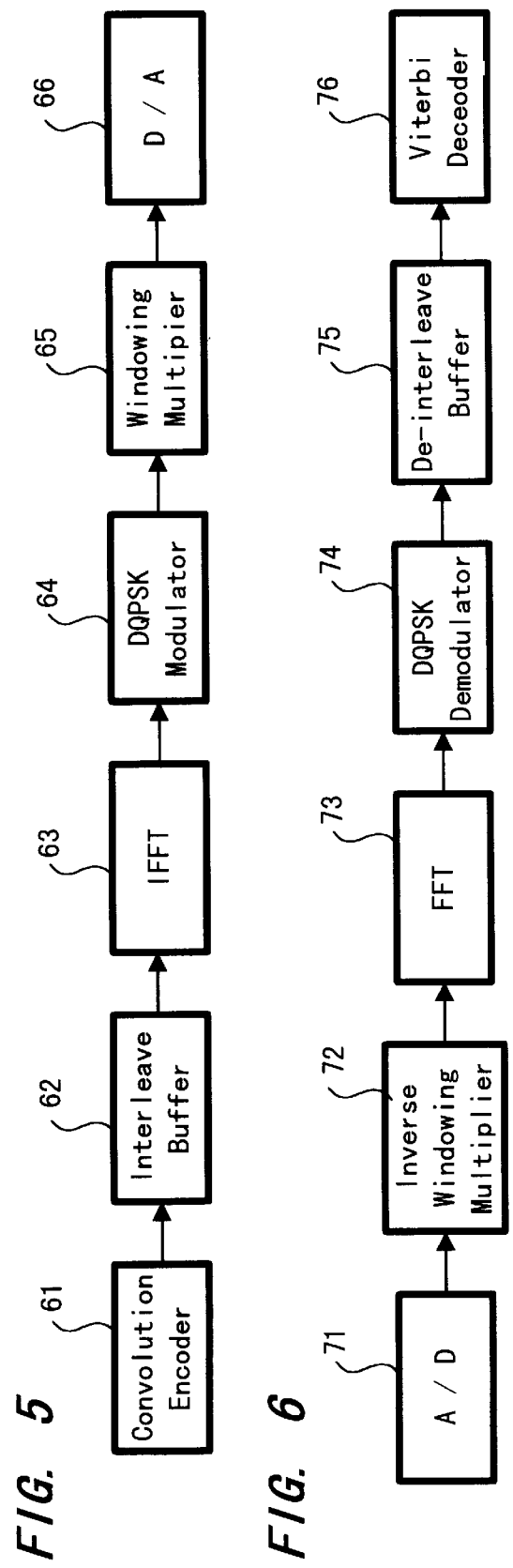
FIG. 5
FIG. 6

COMMUNICATION METHOD, BASE STATION AND TERMINAL APPARATUS

BACKGROUND OF THE INVENTION

1. Field of the Invention

The present invention relates to a method of communication which is applicable to a base station or a terminal equipment of, for example, the cellular wireless telephone system as well as to the base station and the terminal equipment to which the method of communication is applied.

2. Description of the Related Art

In a mobile communication such as a wireless telephone system, a plurality of base stations are arranged at regular intervals to make a service area and the multiple access which makes a plurality of mobile stations (terminal equipments or a subscriber) linked is performed in each base station. In this case, a predetermined transmission frequency band is allocated before hand to the respective base stations and a plurality of transmission channels are set or provided within the transmission frequency band. When a demand for communication is issued from any of the terminal equipments and so on, one of these transmission channels is allocated to that terminal equipment and the terminal equipment uses the allocated transmission channel to make the communication started via the base station.

As the communication system in which the transmission channels are set in this manner, there are, for example, Frequency Division Multiple Access (FDMA), Time Division Multiple Access (TDMA) and Code Division Multiple Access (CDMA), etc.

Describing briefly each of these systems, the communication system of FDMA is one in which a plurality of transmission channels are provided by dividing the transmission band prepared by a unit of frequency. The communication system of TDMA is one in which a transmission channel is divided by a predetermined time unit to form a plurality of time slots within a single transmission channel, each of the time slots being allocated to the terminal equipments to be linked. Therefore, it is possible to link the plurality of terminal equipment using the single transmission channel. The communication system of CDMA is one in which a specified code is allocated to each of the terminal equipments and a carrier having the same frequency is subjected to spectrum spread modulation by the code for transmitting it to the base station. The receiving side discriminates a signal transmitted from that terminal equipment using the same code which is synchronized.

Incidentally, in the wireless telephone system, by whichever system the transmission channel may be provided, the transmitting capacity which can be transmitted by a single transmission channel is determined and so it is impossible to alter the transmitting capacity depending on a class of data to be transmitted. Generally, in case of the wireless telephone system, the transmitting capacity of one transmission channel is set to be such a capacity as is able to transmit audio data for communication by telephone.

However, it is recently being put into practice to enable various data other than audio data to be transmitted by using a wireless terminal such as a portable telephone. If it is possible to transmit data of only a certain transmitting capacity on one transmission channel as described above, it will inconveniently take plenty of time to transmit a great deal of data for example. In order to overcome the inconvenience, it will be necessary to set a greater transmitting capacity as the transmitting capacity which one transmission channel can transmit. However, if the transmitting capacity of one channel is made greater, the wider frequency band width of one transmission channel will become necessary, so that the number of transmission channels which can be set within the transmission frequency band allocated to one base station will decrease. Moreover, when data of comparatively small amount such as audio data are transmitted, data amount transmitted through respective transmission channels becomes smaller than an amount which can be transmitted through that channel, which will result in an inconvenience that the transmission frequency band is not effectively utilized.

SUMMARY OF THE INVENTION

In view of such aspects, it is an object of the present invention to make it possible to cope with the change of the transmitting capacity, etc. in the wireless communication such as the wireless telephone system.

According to a first aspect of the present invention, a cellular system is one having a subscriber and a base station, a communication resource allocation method, and includes a class information transmitting step at the subscriber for transmitting class information about communicated information from the subscriber to the base station, a class information receiving step at the base station for receiving the transmitted class information from the subscriber, and a resource allocating step at the base station for calculating the number of communication resources which is able to be allocated for new communication tasks based on received class information by the class information receiving step and on a resource utilizing situation at the time.

According to a second aspect of the present invention, a base station apparatus of a cellular system includes a class information receiving means for receiving class information transmitted from a subscriber, a resource allocating means for calculating the number of communication resources which is able to be allocated for new communication tasks based on received class information by the class information receiving means and on a resource utilizing situation at the time, and a transmitting means for transmitting an output signal of the resource allocating means to the subscriber.

According to a third aspect of the present invention, a subscriber apparatus of a cellular system includes a transmitting means for transmitting class information about communicating information to a base station, a receiving means for receiving information from the base station. The transmitting means and the receiving means communicate within allocated communication resource by the base station.

BRIEF DESCRIPTION OF THE DRAWINGS

FIGS. 4A to 4C are explanatory diagrams each showing an example of use of the slots in the frame structure of the example of FIG. 3;

FIG. 5 is a block diagram showing modulation processing when one embodiment is applied to the transmission system of the multi-carrier signal;

FIG. 6 is a block diagram showing the demodulation processing when one embodiment is applied to the transmission system of the multicarrier signal.

DESCRIPTION OF THE PREFERRED EMBODIMENTS

An embodiment according to the present invention will be described below with reference to the accompanying drawings.

Figure 1:
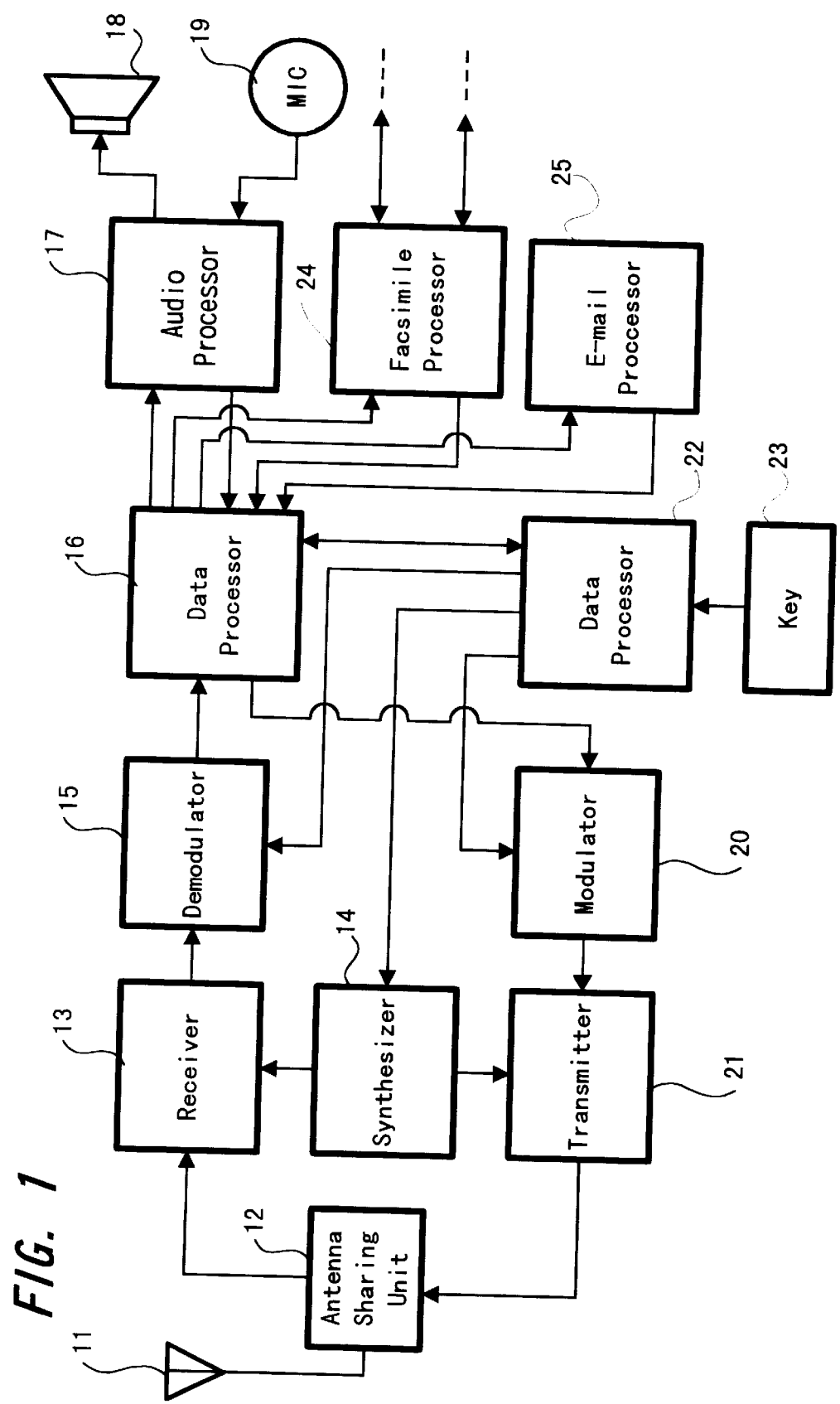
FIG. 1 is a block diagram showing the configuration of the terminal equipment according to an embodiment of the present invention.

In the embodiment, the present invention is applied to the cellular wireless telephone system in which the base stations are arranged at regular intervals to establish a communication area. Firstly, a configuration of the terminal equipment used for the wireless telephone system is shown in FIG. 1. Describing first the configuration of its receiving system, an antenna 11 is connected to a receiver 13 through an antenna sharing unit 12 and an output frequency signal of a frequency synthesizer 14 made of a PLL circuit or the like is supplied to the receiver 13. Here, a received signal supplied from the antenna 11 to the receiver 13 is mixed with the output frequency signal of the frequency synthesizer 14 for converting the received signal of a predetermined frequency into an intermediate frequency signal. In this case, the output frequency of the frequency synthesizer 14 is determined under the control of the control unit 22 which is a system controller for controlling a communicating operation of the terminal equipment.

The received signal converted into the intermediate signal is supplied to a demodulator 15 where a demodulation processing is performed under a prescribed communication standard to make received data in a symbolic sequence. The demodulated received data in the symbolic sequence are supplied to a data processor 16 for extracting necessary data which are supplied to respective corresponding signal processors.

For instance, concerning audio data contained in the received data, they are supplied to an audio processor 17 and converted into an analogue audio signal by audio processing in the audio processor 17 for driving a speaker 18 connected thereto. Concerning facsimile data contained in the received data, they are supplied to a facsimile processor 24 and are made into data for supplying to a facsimile equipment(not shown) in the facsimile processor 24. Also, concerning electronic mail data contained in the received data, they are supplied to an electronic mail processor 25 and are made into data for supplying to an electronic mail receiver (a personal computer or an electronic portable terminal, etc. not shown) in the electronic mail processor 25. Again, concerning control data contained in the received data, they are supplied to the control unit 22 where a corresponding control of communication is performed. In addition, the class of these received data is distinguished by control data, etc. contained in the received data.

Next, describing a transmitting system of the terminal equipment, for example concerning audio data, an audio signal picked up by a microphone 19 connected to the audio processor 17 is made into digital audio data for transmission in the audio processor 17 and the audio data is supplied to the data processor 16 which arranges them in a predetermined position of the symbolic sequence for transmission. In other positions of the symbolic sequence for transmission, a predetermined synchronous pattern and control data supplied by the control unit 22 or the like are arranged.

And then, the transmitting data in the symbolic sequence output by the data processor 16 is supplied to a modulator 20 which performs a modulation processing for transmission, and the modulated signal is supplied to a transmitter 21 which mixes it with the frequency signal output by the frequency synthesizer 14 and frequency converts into a predetermined transmitting frequency. The transmitting signal of the transmitting frequency is supplied to the antenna 11 through the antenna sharing unit 12 for wireless transmission.

Furthermore, concerning a facsimile signal supplied from an unshown facsimile equipment (or a computer equipment to which a modem for facsimile communication is connected, etc.) to the facsimile processor 24, the facsimile processor makes the signal into facsimile data for transmission and supplies the facsimile data to the data processor 16 which performs the same transmission processing as that in the aforesaid case of audio data. Moreover, concerning electronic mail data supplied from an unshown electronic mail transmitting/receiving equipment to the electronic mail processor 25, the electronic mail processor makes it into electronic mail data to the data processor 16 which performs the same transmission processing as that in the case of audio data.

In addition, various keys 23 are connected to the control unit 22 and operations of sending or receiving are performed by means of the keys 23. Furthermore, the terminal equipment according to the present embodiment is capable of performing simultaneously the communication processing of a plurality of transmission channels and the transmission channel is set under the control of the control unit 22. As to the processing which sets simultaneously the plurality of transmission channels, it will be described later. As to the facsimile processor 24 and the electronic mail processor 25, when they do not perform the transmission processing of corresponding data, the operation of these processors is stopped, whereas, when they perform the transmission processing of corresponding data, they are activated under the control of the control unit 22 and then execute a corresponding application program for processing.

In the present embodiment, the facsimile processor 24 and the electronic mail processor 25 comprise a memory means for storing the received data and the transmitting data and transferring these data to the facsimile equipment or the computer equipment connected thereto after once storing the data received from the base station side. On the other hand, they transmit to the base station side the data which are transferred from the facsimile equipment or the computer equipment and stored after the transmission channel has been set. Alternatively, the terminal equipment itself may comprise a function corresponding to the facsimile equipment or the computer equipment.

Figure 2:
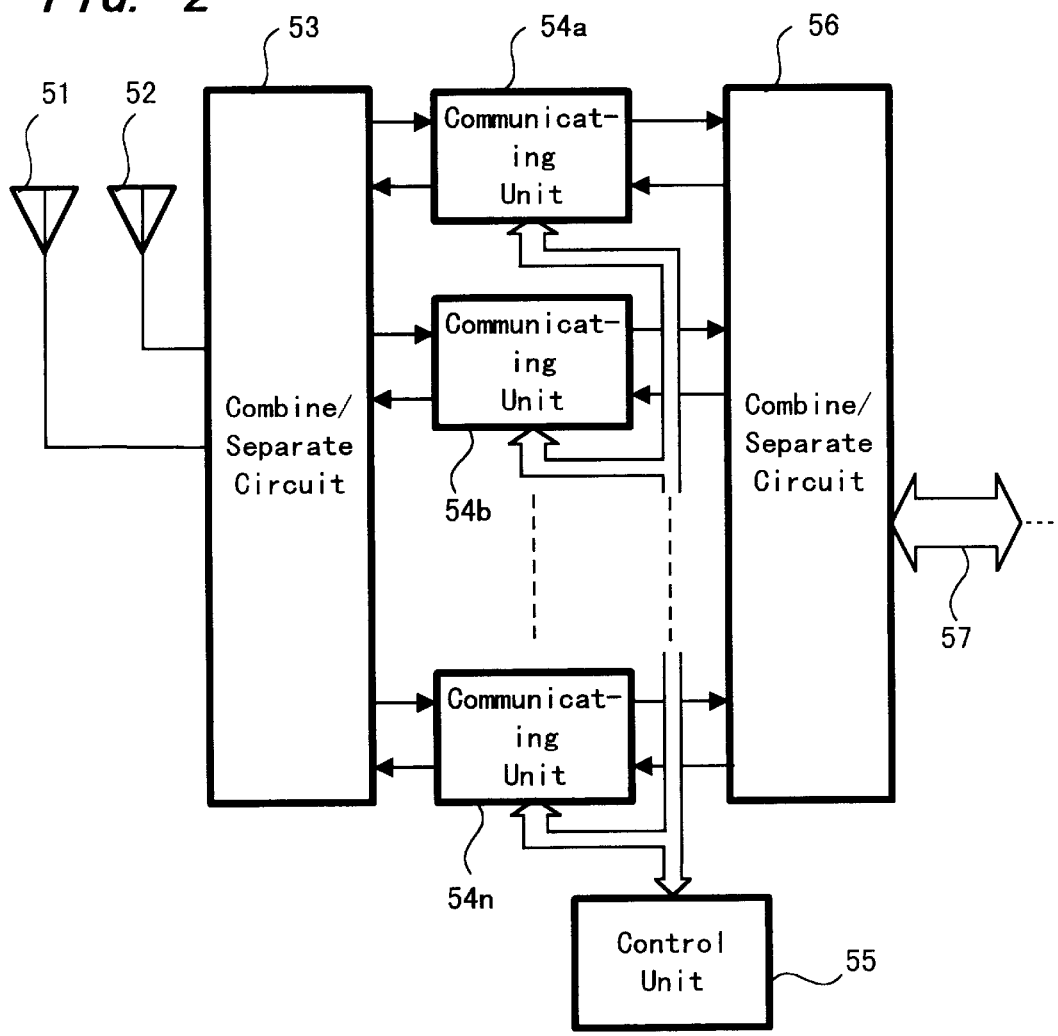
FIG. 2 is a block diagram showing the configuration of the base station according to an embodiment.

Next, referring to FIG. 2, a configuration of the base station which makes communication with the terminal equipment will be described. A basic configuration for the communicating processing of the base station is the same as that of the terminal equipment, but a configuration for making communication simultaneously with a plurality of the terminal equipments is different. Particularly, antennas 51, 52 of two systems are connected to a combine/separate circuit 53 which separates received signals into a signal of each transmission channel, etc. and for separating the received signal from each terminal equipment into signals of plural systems of a single or a predetermined number of terminal equipment(s). The separate received signal of the respective systems is supplied to respective different communicating units 54a, 54b, . . . 54n (where n is an arbitrary number) each of which performs a reception processing, a demodulating processing and a transmission processing for sending the received data demodulated to an exclusive line 57 connected to a communication control station for generally controlling the base stations, thus causing the processed signal to be sent via the combine/separate circuit 56 to the exclusive line 57.

Also, a signal transmitted from the side of the exclusive line 57 to the base station is separated by the combine/separate circuit 56 into signals of plural systems and the separated signals of each system are supplied to the respective different communicating units 54a, 54b, . . . 54n which perform the reception processing from the exclusive line 57 and then perform the modulation processing and the transmission processing for transmitting them to the terminal equipment, thus making them to be supplied to either of the antennas 51 and 52 via the combine/separate circuit 53 for wireless transmission.

In addition, the transmission processing and the reception processing in each of the communicating units 54a to 54n of the base station are performed under the control of a control unit 55, and necessary addition or distinction, etc. of control data is also performed under the control of the control unit 55. Further, when call demand data are transmitted from the terminal equipment to the base station of the present embodiment, data indicating a class of data to be transmitted are added. Concerning the class of data, at least audio data for communication by telephone or data other than the audio data for communication by telephone (facsimile data, electronic mail data, etc.) are differentiated.

Next, a state of communication when a communication is made between the above terminal equipment and the base station will be described. In the present embodiment, the transmitting capacity when a communication is made between the terminal equipment and the base station can be set adaptively. The processing for adaptively setting the transmission capacity when the TDMA system (time division multiple access) is applied as a communication system between the terminal equipment and the base station will be described. In case of TDMA-TDD (time division duplex) system, the transmitting frequency is equal to the receiving frequency and as a transmission signal which is transmitted using the same frequency a burst signal for a predetermined unit time (e.g. several hundred μsec or so) is used, the burst signal being intermittently transmitted and received between the terminal equipment and the base station.

Figure 3:
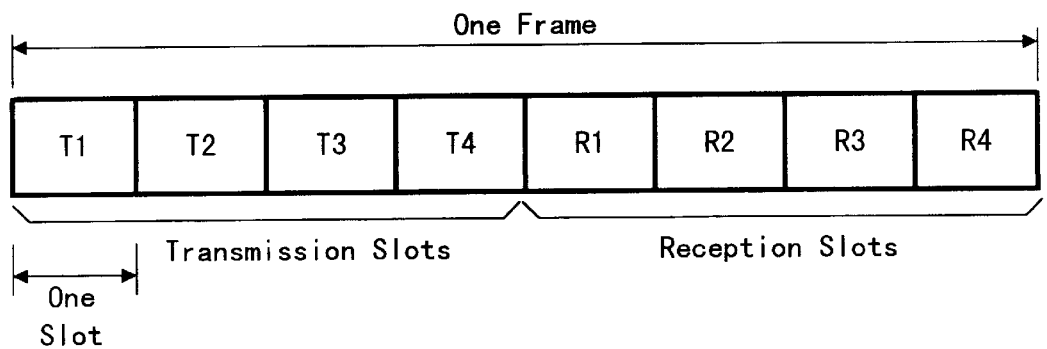
FIG. 3 is an explanatory diagram showing the structure of the frame when one embodiment is applied to TDMA system.

The burst signal of one unit corresponds to a signal of one slot period, and, for examples an eight slots period defines one frame as shown in FIG. 3, this one frame being repeated. When one frame is defined by the eight slots period, for example, the first half of four slots of one frame is used for transmitting from the base station and the second half of four slots is used for receiving at the base station. Here, the first half of the four slots period forming the transmitting slots period are given slot numbers as slot T1, T2, T3 and T4 and the second half of the four slots period forming the receiving slots period are given slot numbers as slot R1, R2, R3 and R4.

When the audio data (audio data for communication by telephone which are processed by the audio processor 17 in the terminal equipment) are transmitted, the bidirectional communication is performed using the slots T1, R1 as shown in FIG. 4A between one terminal equipment and the base station. Also, between another terminal equipment and the base station, the bidirectional communication is performed using the slots T2, R2. Concerning also slots T3, R3 and slots T4, R4, the communications with respective other terminal equipments is performed. Accordingly, when the audio data for communication by telephone is transmitted, theoretical four transmission channels are set using one transmission frequency band and so it is possible to simultaneously communicate with up to four terminal equipments.

Furthermore, the terminal equipment according to the present embodiment is able to transmit and receive the data other than the audio data. In that case, the base station will estimate the transmitting capacity for data to be transmitted and determine the number of slots allocated to a communication between one terminal equipment and the base station. Particularly, in case of data that will require almost the same transmitting capacity as that of the case where the audio data are transmitted, the transmission channel which uses one transmitting slot and one receiving slot in one frame will be set, as shown in FIG. 4A.

Moreover, in case of data which require the transmitting capacity about twice that of the case where the audio data are transmitted, the transmission channel which uses two transmitting slots and two receiving slots (here, T1, T2 and R1, R2 are used) in one frame for one terminal equipment will be set, as shown in FIG. 4B. Furthermore, in case of data which require the transmitting capacity about three times that of the case where the audio data are transmitted, the transmission channel which uses three transmitting slots and three receiving slots (here, T1, T2, T3 and R1, R2, R3 are used) in one frame for one terminal equipment will be set, as shown in FIG. 4C. In addition, in case of data which require the transmitting capacity about four times that of the case where the audio data are transmitted, the transmission channel which uses all transmitting slots and all receiving slots in one frame for one terminal equipment will be set. However, the slot allocation is not limited to the continuous slot allocation as shown in FIGS. 4B, 4C, but may be such allocation that separate slots (e.g. transmitting slot T1 and T3) are simultaneously employed.

In the present embodiment, when data other than such audio data are to be transmitted, the setting of the number of slots to be used is performed by estimating a vacant channel condition within the transmission frequency band allocated to the present base station. Particularly, if there are sufficient vacant channels (i.e. slots unused for communication) within the transmission frequency band allocated to the present base station, such a channel allocation is performed that the simultaneous use of plural slots as shown in FIGS. 4B, 4C is allowed. Conversely, if it is estimated that there are few vacant channels, even though a transmission start demand of data other than the audio data may be issued, only an allocation of a transmission channel with the minimum capacity (i.e. the allocation of one transmitting slot and one receiving slot in one frame, as shown in FIG. 4A) is performed, and data transmission takes place at a low transmission rate with the minimum transmitting capacity. With the data transmission at the low transmission rate, it will take some time to complete the data transmission, whereas by providing memories to store the transmitted data in both the transmitting side and the receiving side, it will be possible to cope with the change of the transmission rate.

Further, in such a channel allocation, after the transmission of data other than the audio data has been started, the number of slots to be used may be changed depending on the estimation of the vacant channels by the control unit of the base station. For example, it is conceivable that, after the communication has been started under the minimum slot allocation of one transmitting slot and one receiving slot in one frame, if the control unit 55 of the base station estimates that the vacant channels increase and room is made in links, channel allocation data for increasing the number of slots to be allocated are transmitted to the terminal equipment under communication in order to increase the number of slots to be allocated in the middle of communication for increasing the transmitting capacity.

Conversely, when the communication has been started under the allocation of plural transmitting slots and plural receiving slots in one frame, if the control unit 55 of the base station estimates that the vacant channels decrease, the channel allocation data for decreasing the number of slots to be allocated may be transmitted to the terminal equipment under communication in order to decrease the number of slots to be allocated in the middle of communication for decreasing the transmitting capacity.

Moreover, when a transmit demand of the transmission of data other than the audio data is issued from the terminal equipment, etc. to the base station, if the control unit 55 of the base station estimates that there are few vacant channels, the channel allocation for that transmit demand may not be performed, and when the vacant channels (the number of vacant slots) increases over a predetermined value, the channel allocation for that transmit demand may be performed.

Furthermore, in the aforesaid embodiment, the same number of slots are allocated for both an up link from the terminal equipment to the base station and a down link from the base station to the terminal equipment, whereas when the slot allocation is performed for the transmission of data other than the audio data, plural slots may be allocated only to the link in the direction of data transmission.

Having described the TDMA-TDD system in which the same transmitting frequency is used for both the up link from the terminal equipment to the base station and the down link from the base station to the terminal equipment, the above slot allocation is of course applicable to a case where data are transmitted in such a frame structure that the slots are arranged in the up link and the down link respectively using transmitting frequencies different between the up link and the down link.

Having described so far the embodiment in which the present invention is applied to TDMA system, the present invention's processing is of course applicable to other communication systems. By way of another example, a case where the present invention is applied to a system in which a multicarrier signal is transmitted will be described below.

When performing the transmission of the multicarrier signal, a plurality of subcarriers are arranged at intervals of a predetermined frequency within one transmission frequency band required for the communication between the base station and the terminal equipment, and information are dispersed to the respective subcarriers to modulate them for data transmission. For example, as a modulation processing in the base station or the terminal equipment (In case of the terminal equipment, it corresponds to the modulation processing in the modulator 20. In case of the base station, it corresponds to the modulation processing included in each communicating unit 54a to 54n), a processing of a configuration shown in FIG. 5 will be performed.

Thus, the transmitting data in the symbolic sequence are supplied to a convolution encoder 61 where they are encoded into convolution encoded data which are supplied to an interleave buffer 62. The buffer 62 performs an interleave processing which rearranges the data arrangement in a unit of a predetermined length and the interleaved data is made into a transmitting signal which is DQPSK modulated by a DQPSK modulator 63. The modulated transmitting signal is supplied to an inverse fast Fourier transform circuit (IFFT circuit) 64 where the fast Fourier transform processing is performed, the transform processing being such that data arranged on the frequency axis are transformed into the multicarrier signal arranged on the time axis.

And then, the multicarrier signal output by the FFT circuit 64 is supplied to a window multiplier circuit 65 where every signal of a predetermined unit length is multiplied by window multiplier data, and the data multiplied by the window multiplier data are converted into an analogue signal in a digital/analogue converter 66. The analogue signal is supplied to the transmitter 21 (see FIG. 1) where it is frequency converted for transmitting with a predetermined frequency band.

Next, as a demodulation processing in the terminal equipment or the base station which receives the multicarrier signal processed and transmitted in this manner. In case of the terminal equipment it corresponds to the demodulation processing in the demodulator 15. In case of the base station, it corresponds to the demodulation processing contained in each communicating unit 54a to 54n), a processing is shown in FIG. 6.

Thus, the signal received and converted into the intermediate signal is supplied to an analogue/digital converter 71 where it is sampled by a predetermined sampling frequency, and the sampled data are supplied to an inverse window multiplier circuit 72 where every signal of a predetermined unit length is multiplied by inverse window multiplier data (data inverse to the window multiplier data when transmitting) for restoring the original data. The restored data are supplied to the fast Fourier transform circuit (FFT circuit) 73 which performs the fast Fourier transform processing for transforming the multicarrier signal arranged in time series into data of each of sub-carriers. The transformed signal is then supplied to a DQPSK demodulator 74 for demodulation processing and the demodulated signal is supplied to a deinterleave buffer 75 which performs a deinterleave processing for restoring the original arrangement. The data of the original arrangement which are interleave processed are supplied to a Viterbi decoder 76 which performs a decode processing of the convolution encoded data for providing received data of the symbolic sequence.

The foregoing encoding and decoding are not restricted to the convolution coding and the Viterbi decoding. It will be sufficient to prepare an encoder for taking a large distance between the transmitting symbolic sequences for the encoding, and a decoder which performs the maximum likelihood sequence estimation on the bases of the receiving symbol for the decoding. Thus, the know Turbo code or the like can be employed.

Figure 7A:
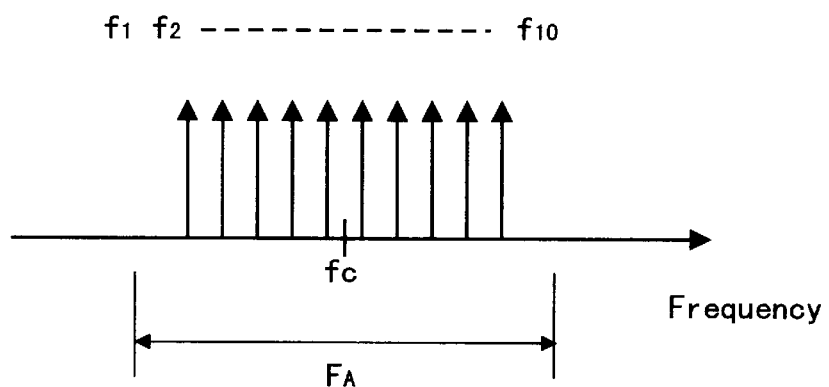
FIGS. 7A and 7B are explanatory diagrams showing the transmitting condition of the multicarrier signal according to the examples of FIG. 5 and FIG. 6.
Figure 7B:
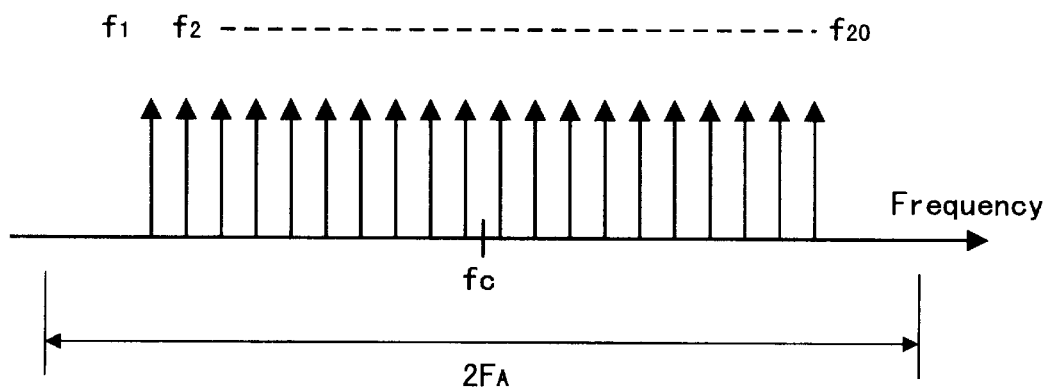

Next, a processing for simultaneously transmitting data of plural classes in the case where the multicarrier signal thus processed is transmitted will be described with reference to FIGS. 7A, 7B. Firstly, as shown in FIG. 7A, one transmission frequency band $F_A$ having a predetermined frequency band width (e.g. 150 $kH_z$ width) is established, and in a center of that frequency band ten subcarrier signals $f_1$, $f_2$, ... $f_{10}$ are arranged at intervals of a predetermined frequency (e.g. 12.5 $kH_z$ interval) for transmitting the respective subcarriers modulated by the data. In this regard, for example, data such as the audio data are dispersed and modulate these ten subcarrier signals $f_i$ to $f_{10}$ for transmission, and the audio data are bidirectionally transmitted between the terminal equipments linked via the base station, thus enabling a data transmission such as a communication through the voice to be performed. Further, in FIGS. 7A, 7B, $f_c$ denotes a central frequency.

A transmitting condition shown in 7A corresponds to the case where the audio data for communication by telephone are transmitted as well as the case where the minimum channel allocation is performed when data other than the audio data are transmitted. When data other than the audio data are transmitted, if there is room for vacant channels of the transmission channel allocated to the base station, two or more transmission frequency bands will be allocated. For example, as shown in FIG. 7B, when a transmission frequency band of $2F_A$ twice that in the case of FIG. 7A is allocated using the transmission frequency band for two channels, twenty subcarrier signals $f_1, f_2 \ldots, f_{20}$ are arranged so that data may be dispersed and modulated by the respective subcarrier signals for transmission, thereby ensuring the transmitting capacity twice that in the case where the audio data are transmitted. Although not shown, it will be possible to allocate three or more times the transmission frequency band.

The allocation of the transmission frequency band when the multicarrier signal is transmitted may be performed under the control of the control unit 55 in the base station by the same processing as that in the case where the slot allocation is performed according to the aforesaid TDMA system.

In addition, when the multicarrier signal is transmitted, the frequency interval of the multicarrier signal within one transmission frequency band may be narrowed for increasing the number of the subcarrier signal being arranged rather than increasing the transmission frequency band for increasing the transmitting capacity. For example, when the audio data for communication by telephone are transmitted, the ten subcarrier signals may be arranged within one transmission frequency band at intervals of 12.5 $kH_z$, and when other data are transmitted and the transmitting capacity is desired to be greater, the twenty subcarrier signals may be arranged within one transmission frequency band at intervals of 6.25 $kH_z$.

Having described the embodiment in which the video data for facsimile and the data for electronic mail as the data other than the audio data are transmitted, the present invention is of course applicable also to a case where other classes of data are transmitted. Moreover, it is also applicable to a communication to which a transmission system other than TDMA system and the multicarrier system is applied, particularly to a processing for simultaneously setting a plurality of logical transmission channels in that communication. For example, in case of CDMA system, when the transmitting capacity is to be increased, if data to be transmitted are caused to be dispersed by using a plurality of spread code and at the same time the plurality of logical transmission channels are set for transmission, it will be possible to deal with it. Furthermore, a destination of each application is not restricted to one place and it may be possible to communicate with different destinations.

According to the present invention, by enabling at least a first transmission channel and a second transmission channel to be set as the transmission channel depending on a class of information to be transmitted, setting the first transmission channel to have a fixed transmitting capacity, and setting the second transmission channel so that the minimum transmitting capacity may be determined and a transmission capacity greater than the minimum transmitting capacity may be set depending on the setting condition of the transmission channels within the transmission frequency band prepared, concerning data for which the transmitting capacity is fixed such as the audio data, if the first channel is set for transmission, the efficient transmission without a waste of transmitting capacity can be performed, and at the same time, when a great deal of data are to be transmitted, it is sufficient to use the second channel and to set the transmitting capacity greater, thereby allowing a communication in which the prepared transmission frequency band is effectively utilized to be made.

In this case, the second transmission channel is set so that the transmitting capacity may be made variable depending on a change of the setting condition of the transmission channel within the transmission frequency band prepared, thereby causing an appropriate transmitting capacity to be set depending on the vacant channel condition, etc at that time, which in turn results in a communication in which the transmission frequency band is more effectively utilized.

Furthermore, when making the transmitting capacity variable, by setting the transmitting capacity of the second transmission channel so that the transmitting capacity may be limited to a minimum when there are few vacant channels within the transmission frequency band prepared, it is possible to secure necessary channels in the wireless telephone system or the like.

Moreover, in the aforesaid case, by setting the second channel only when there are vacant channels more than the predetermined value within the transmission frequency band prepared, only when there is room for links, the channel whose transmitting capacity is adaptively set will be prepared, whereas when the links are crowded only the transmission channel of fixed capacity will be set for making the transmission frequency band to be effectively unitized.

In addition, in the above case, by making information transmitted through the first channel to be audio information and making information transmitted through the second channel to be information other than the audio, information such as the audio communication by telephone requiring the real-time nature are satisfactorily transmitted through the transmission channel of fixed transmitting capacity, and at the same time, concerning the data for electronic mail or the data for the computer whose data amount is uncertain, when there is room for the links, it is possible to transmit them fast through the transmission channel of greater capacity, thus enabling the appropriate transmission depending on the class of respective information to be performed.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A communication resource allocation method in a cellular system having a subscriber and a base station, comprising:

a class information transmitting step at said subscriber for transmitting class information about communicated information from said subscriber to said base station;

a class information receiving step at said base station for receiving said transmitted class information from said subscriber; and a resource allocating step at said base station for calculating a number of communication resources to be allocated for new communication tasks based on the received class information obtained by said class information receiving step and on a present resource utilizing situation, wherein

- a minimum value of the number of communication resources newly allocated in response to said class information is one if communicating information is an audio signal, and
- a minimum value of the number of communication resources newly allocated in response to said class information is zero if communicating information is not an audio signal, and wherein
  - if a totality of communication resources exceeds a predetermined value, then a quantity of resource allocation for a communication which is already allocated is reduced.

2. The communication resource allocation method according to claim 1, wherein said number of communication resources is a number of channels in an FDMA format.

3. The communication resource allocation method according to claim 1, wherein said number of communication resources is a number of time slots in a TDMA format.

4. The communication resource allocation method according to claim 1, wherein said number of communication resources is a number of sub-carriers in a multi-carrier format.

5. The communication resource allocation method according to claim 1, wherein said number of communication resources is a number of spread codes in a CDMA format.

6. The communication resource allocation method according to claim 4, wherein said multi-carrier format has a group of a predetermined number of sub-carriers within at least one predetermined time slot as a communication unit.

7. A base station apparatus of a cellular system having a subscriber comprising:

class information receiving means for receiving class information transmitted from said subscriber;

resource allocating means for calculating a number of communication resources to be allocated for new communication tasks based on said class information received by said class information receiving means and on a present resource utilizing situation; and transmitting means for transmitting an output signal of said resource allocating means to said subscriber, wherein

- a minimum value of the number of communication resources newly allocated in response to said class information is one if information to be transmitted to said subscriber is an audio signal, and
- a minimum value of the number of communication resources newly allocated in response to said class information is zero if information to be transmitted to said subscriber is not an audio signal, and wherein
  - if a totality of communication resources exceeds a predetermined value, then a quantity of resource allocation for a communication which is already allocated is reduced.

8. The base station apparatus according to claim 7, wherein said number of communication resources is a number of channels in an FDMA format.

9. The base station apparatus according to claim 7, wherein said number of communication resources is a number of time slots in a TDMA format.

10. The base station apparatus according to claim 7, wherein said number of communication resources is a number of sub-carriers in a multi-carrier format.

11. The base station apparatus according to claim 7, wherein said number of communication resources is a number of spread codes in a CDMA format.

12. The base station apparatus according to claim 10, wherein said multi-carrier format has a group of a predetermined number of sub-carriers within at least one predetermined time slot as a communication unit.

* * * * *